Figure 1:
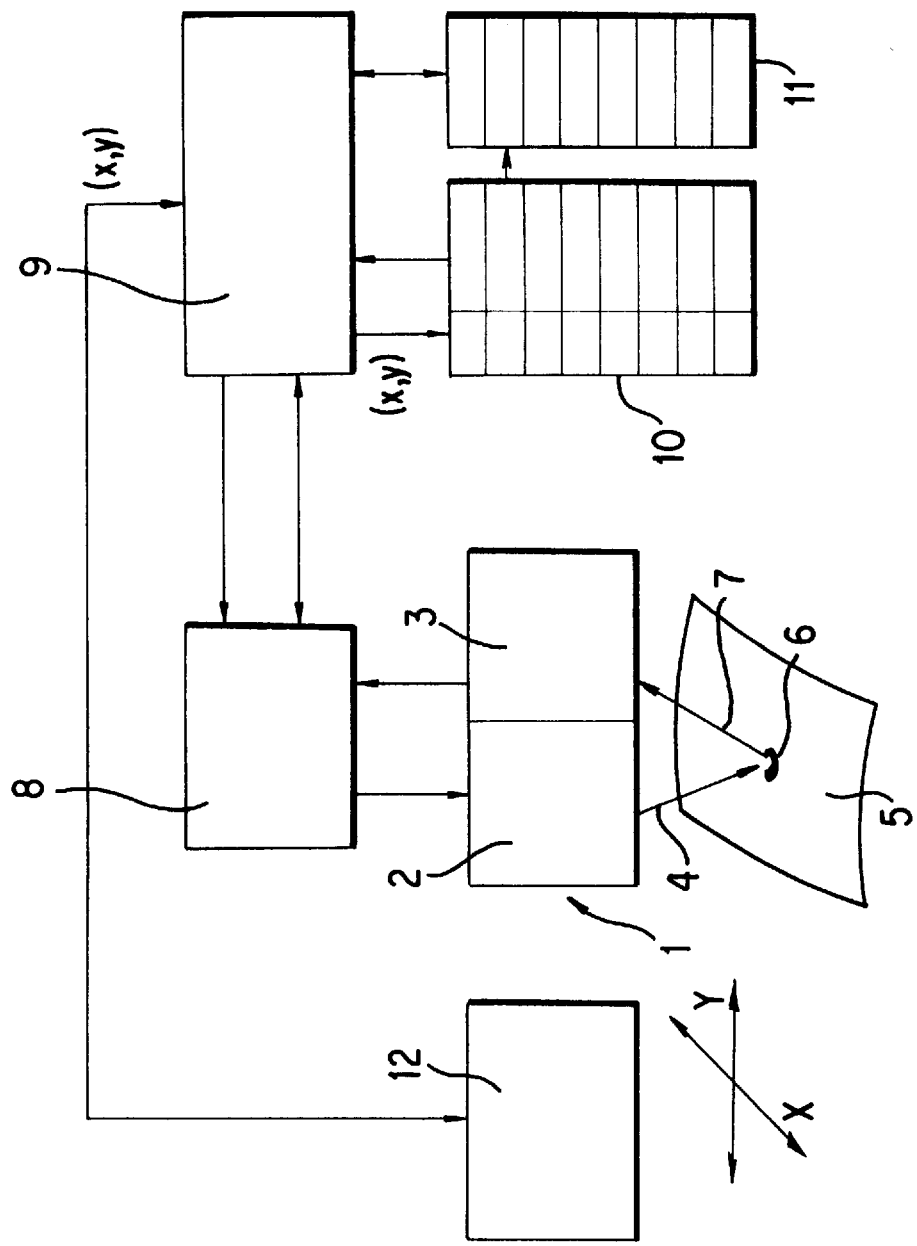

United States Patent [19]
Fontal et al.

[11] Patent Number: 5,852,745
[45] Date of Patent: Dec. 22, 1998

[54] GRAPHICAL SHEET TECHNIQUE FOR AUTOMATICALLY CHANGING THE CONDITIONS OF A PRINTER/PLOTTER

[75] Inventors: Juan B. Belon Fontal, San Diego, Calif.; Joseph Giralt Adroher, Esplungues de Llobregat; Andrew David Mackenzie, La Floresta, both of Spain

[73] Assignee: Hewlett-Packard Company, Pala Alto, Calif.

[21] Appl. No.: 743,338

[22] Filed: Oct. 1, 1996

Related U.S. Application Data

[63] Continuation of Ser. No. 234,160, Apr. 28, 1994, abandoned.

[30] Foreign Application Priority Data

Jun. 21, 1993 [EP] European Pat. Off. .............. 93500089

[51] Int. Cl.⁶ .............................. G06F 15/46; G09F 19/00
[52] U.S. Cl. ............................................. 395/835; 395/838
[58] Field of Search ..................................... 395/835, 838, 395/821

[56] References Cited

U.S. PATENT DOCUMENTS 3,681,773 8/1972 Russell et al. ............................. 346/29
4,377,852 3/1983 Thompson ................................ 364/900
4,579,467 4/1986 Furukawa ................................ 400/124
4,675,476 6/1987 Kobayashi .............................. 323/343
5,136,233 8/1992 Klinkenberg et al. ................... 323/343
5,247,693 9/1993 Bristol ..................................... 395/800

FOREIGN PATENT DOCUMENTS

| 2-179799 | 7/1990 | Japan . |
| 2179799 | 12/1990 | Japan . |
| 2 184 328 A | 6/1987 | United Kingdom . |
| WO- A-89 11144 | 11/1989 | WIPO . |
| WO-A-93 05480 | 3/1993 | WIPO . |

*Primary Examiner*—Thomas C. Lee
*Assistant Examiner*—Rehana Perveen
*Attorney, Agent, or Firm*—David S. Romney

[57] ABSTRACT

A technique for altering the operating conditions of a printer/plotter, which includes a laminar medium on which the coded marks are made in accordance with parameter values, an optical detector system for reading the laminar medium, a so-called acquisition system which picks up the signals from the optical system, and a microprocessor which can compare the coded values for the parameters with equivalence tables in order to provide the appropriate instructions to the printer/plotter components for changing the parameter settings.

16 Claims, 2 Drawing Sheets

GRAPHICAL SHEET TECHNIQUE FOR AUTOMATICALLY CHANGING THE CONDITIONS OF A PRINTER/PLOTTER

CROSS-REFERENCE TO RELATED APPLICATION

This is a continuation of application Ser. No. 09/234,160 filed on 28 Apr. 1994 now abandoned.

The present invention relates to a method and device for automatically changing the operating conditions in various types of machines and apparatus.

As is known, the operating conditions of machines and apparatus, also known as a whole as "configurations", depend on the specific values which are assigned to the different parameters coming into play in the functioning of the machine or apparatus in question. Thus, for example, the operating conditions of a machine-tool can be given as the velocity of the plate supporting the workpiece, the velocity of linear displacement of the tools, the number of tools, the linear path of the tools, and many other factors. In machines such as graph-plotting apparatus, the parameters to be varied may be the language, the graphic language characteristics, the page format, the type of pens to be used, and other. In other types of machines, the operating conditions depend on specific parameters relating to the operating characteristics of the machine itself.

The variation of the values of the different parameters defining the "configuration" of the machine are performed by different types of means available to the user, which are conventionally known as the user interface in the case of electronic machines and apparatus.

In general, the process for setting the values of the parameters regulating the operating conditions is performed by assemblies consisting of a display screen and associated keyboard constituting the user interface. A series of menus can be represented on the screen and the user can follow the menus and submenus using the keyboard and can select the most convenient options. Conventionally, the screens consist of two-lines of 16 characters or two lines of 20 characters, although screens with larger dimensions can also be used, notwithstanding the question of cost.

This process of setting by the user is difficult to the necessary time for performing the process and to the relative difficulty of its realization, since the two-line screen cannot usually provide all the information necessary for the user to be able to know the operating conditions of the apparatus and the actions to be performed in order to vary them. The user is therefore obliged to perform a number of successive steps via the screen until he discovers completely the actual configuration or setting of the apparatus or machine until complete the new setting or configuration desired.

The present invention is to overcome the above disadvantages, and its object is to provide a method and the corresponding device or means for rapid consultation of the configuration or setting of the apparatus or machine and in order to vary it very rapidly and without the need to use display screens. It enables the machine or apparatus to be used extraordinarily simply as well as representing a considerable saving, as a result of the elimination of costly display screen systems.

In order to achieve theirs objects, the present invention provides the arrangement of laminar medium for carrying graphic signals coded according the values for each of the parameters to be set such that, when the said laminar medium carrying the coded graphic marks is fed to the machine, the apparatus or machine itself can interpret the instructions for setting the different parameters present in the graphic signals of the writing medium, emitting instructions for correcting the said parameters to the relevant components of the machine or apparatus such that the latter can function under the new conditions laid down.

Essentially, the laminar medium comprises positioning reference marks of the fixed type which are to be interpreted by the interface which relates the relative graphic marks to the parameters taking account of the position of the reference signals, one essential advantage of which is that the inclined or offset arrangement of the laminar medium being able to represent errors in the interpretation of the graphic marks is avoided. The said graphic marks, produced on the laminar medium, are read by a reader device incorporated in the apparatus or machine itself and the results of this reading stage are compared with the tabulated values in the system microcomputer such that they can be associated with the values of the parameters of the new setting or configuration.

The present invention preferably provides that the assembly of means for changing the values of the setting parameters includes the ability to print, such that the actual setting parameter values can be reproduced on a laminar medium such that, in order to know precisely the setting state of the machine or apparatus, the user has only to consult a laminar medium printed by the machine itself, which medium shows the graphic marks corresponding to the actual setting state of the machine, which is easy for the user to read and interpret, and the user can introduce new marks corresponding to the new parameter values if he wishes to alter the machine setting.

The invention therefore essentially comprises the said laminar medium on which the coded marks are made in accordance with parameter values, an optical detector system for reading the laminar medium, a so-called acquisition system which picks up the signals from the optical system, and a microprocessor which can compare the coded values for the parameters with equivalence tables in order to obtain the equivalence between the marks and the required values for the parameters, the microprocessor finally emitting the appropriate instructions to the machine or apparatus components for changing the setting value parameters.

Preferably, the detector system is an optical reflection transducer, also known by the letters ORT (Optical Reflective Transducer). This system comprises a light emitter in the form of a light-emitting diode (LED), which sends a light beam which is reflected by the laminar medium carrying the coded marks, the reflection being detected by a photodiode of the device itself. The output of the ORT is processed by the acquisition system and transferred to the microprocessor. The signal input into the microprocessor is the level of intensity of the light reflection which the microprocessor uses in order to measure the contrast of the marks plotted by the user on the laminar medium.

The microprocessor will examine each of the intervals of the said laminar medium or stencil which is indexed with respect to the reference marks on the laminar medium which were previously indicated and which were identified initially. Its object is to prevent the reading of the coded marks being varied with slight deviations or displacements of the laminar medium in the user interface.

As will be appreciated, the present invention enables substantial cost-savings to be achieved, in particular as regards apparatus comprising optical reader systems, since it substantially reduces the complexity of the means to be used.

It should be borne in mind that known systems with display screens, such as those known under the abbreviations VFD, LED, LCD, etc. are expensive and their cost represents a significative percentage of the total cost of the system.

It should also be noted that, from the point of view of design of the system, it should be possible to dispense with the display screens, which also avoids the numerous problems which they cause in other components of the electronic systems and which render necessary the introduction of specific means for their correction, such as those known as electrostatic discharge systems (EDS) and electromagnetic interference systems (EIS) which affect the mechanical and electrical design of the machine or apparatus.

Likewise, the devices incorporating display screens with menu-driven systems have considerable problems with respect to their design for increasing their capacity for use. Since the user is generally not familiar with the method which requires interaction on his part and this method is awkward for him to perform, considerable efforts with respect to design and testing of the apparatus are required in order to achieve an acceptable capacity for use.

In this respect, the present invention represents a considerable advance since, as a result of requiring simply a laminar setting medium or sheet on which graphic marks are to be made, it represents a system which is familiar and comfortable for its users. It has fewer design problems and a greater capacity and acceptance of its use.

It should be noted that the interactive systems, based on combinations of display screen and tree-type menus, represent an interface system which is unfamiliar to the majority of users who are not very familiar with the tree-type menus and who do not know how to use menu-driven interfaces for electronic apparatus.

Moreover, the majority of systems with a display screen and tree-type menu provide little information about the context or scenario to assist the users in their task. The user does not know:

the position in the menu tree preceding the actual position;

the actual position of the menu tree;

the options which feel below the actual position in the menu tree or to the side of the latter.

The users have to pass through the entire menu tree in order to discover the available settings and they have to effect the examination cycle for each setting of all the possible options in order to discover which options are available.

In contrast, in accordance with the present invention, the user interface is familiar to the majority of users, as its combination of components, which are simply integrated by a laminar medium on which graphic marks are to be made manually and which is to be fed to the machine using only its control panel.

The present invention is therefore characterised by a method which comprises:

a) producing of marks on a laminar medium which are coded in accordance with values of the configuration or setting parameters of the machine or apparatus;

b) supplying the laminar medium with the marks produced to an automatic reader head in the machine;

c) automatically reading of the graphic signals provided on the laminar medium by means of the reader head incorporated in the machine or apparatus control components;

d) transmitting the reading result to the system microprocessor;

e) comparing the values read with fixed tables which are stored in the computer memory and comprise the equivalents of the parameter values; and f) emission of instructions by the microprocessor to the components of the machine which operating conditions depend of the precise values of the various parameters.

Likewise, this method comprises making fixed reference marks beforehand in the laminar medium, the different setting marks for the parameters being indexed to the said basic references, and making graphic marks on the laminar medium by the shading of pre-traced zones disposed on the laminar medium in the zones corresponding to the coded values of the parameters, at predetermined points of a coordinate system relating to the reference marks of the laminar medium.

In accordance with the present invention, the graphic marks on the laminar medium are read in two successive phases, in the first of which the reference Marks of the laminar medium are read and in the second of which the plotting Marks relating to the said laminar medium reference Marks are read.

The device provided by the present invention comprises a head which emits light and detector reflected light which can emit light and detect light reflected from a laminar medium carrying graphic marks, the said head being associated with a signals acquisition and conditioning unit which is associated with a microprocessor in which the values of the luminous level of light reflected are compared with tables of parameter values permanently stored in the computer memory, the microprocessor being connected to the operative mechanical components of the machine which receive corresponding setting instructions from the microprocessor, and the light emitting unit comprises linear light emitting diodes which emit light of constant intensity. The head which emits light and detects reflected light is a unit of the reading head of a graph plotting apparatus.

Among the advantages for the user provided by the present invention the following can be mentioned:

greatly reduced direct interaction with the apparatus or machine. Once the setting sheet has been positioned in the device, the setting process does not require any further interaction by the user, nor is it necessary for any control to be performed;

separate (Off-line) preparation of the required setting. The setting sheet can be produced by the user in the required place and at the required time, and used at the desired moment. This thus means that the apparatus or machine, in particular a peripheral, can continue to be used whilst the user "changes" the setting or configuration;

observation completely of all the settings in one go. In contrast to what happens in the menu tree system in which the user has to pass through the entire tree system in order to discover the apparatus or machine configuration, with the present invention all the parameters and possible options are visible instantaneously on the laminar medium;

setting configurations prepared beforehand. Various setting sheets with different configurations prepared previously and filed until the moment when they are needed for its use are available to the users;

direct access to the required settings. The user can access directly the setting which he wishes to perform without having to pass through the complete menu tree and by performing solely the setting change desired.

Figure 2:
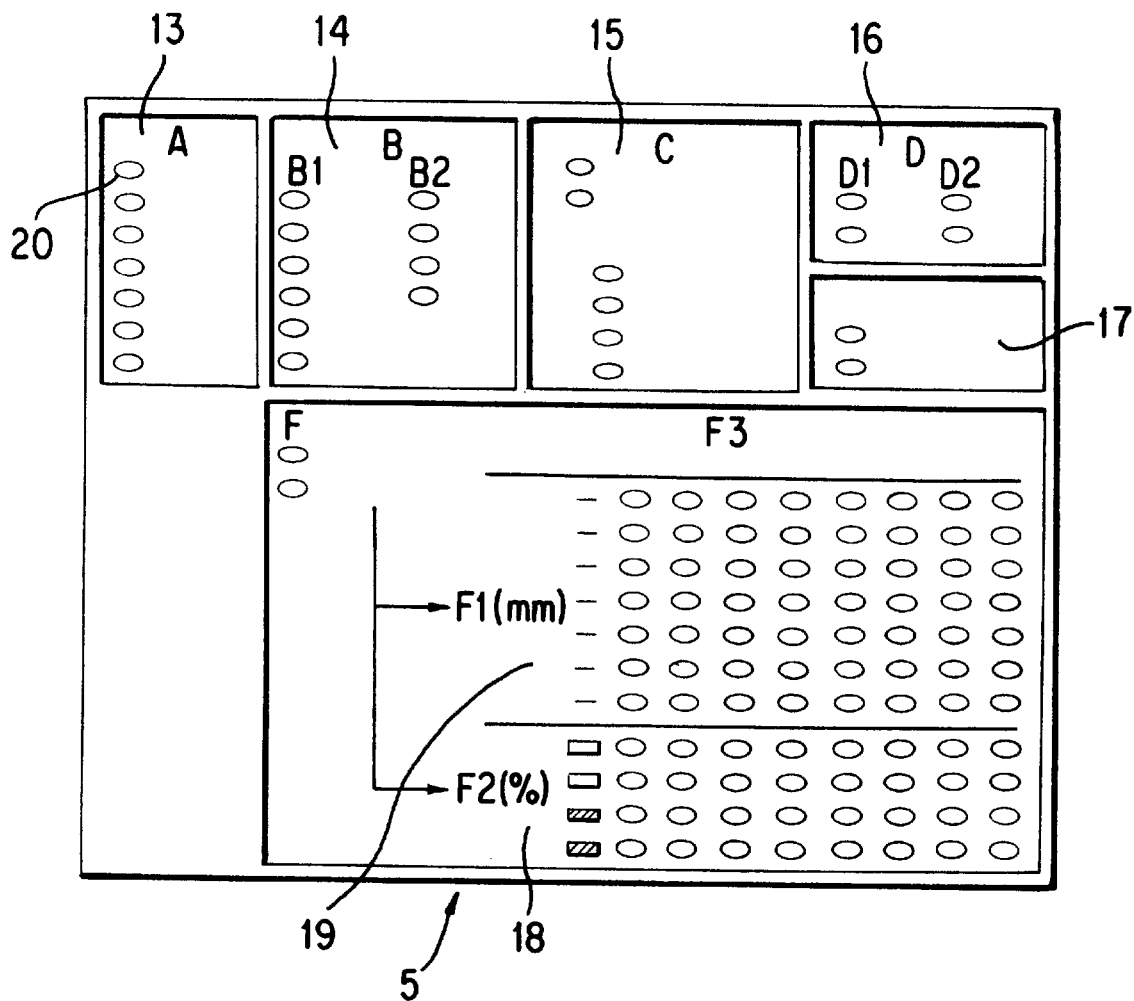

For better comprehension of the present invention, explanatory drawings are appended thereto, in which:

FIG. 1 shows a block diagram showing schematically the principal constitutive components of the present invention; and FIG. 2 also shows schematically an example of the laminar medium for setting parameters.

As shown in the Figures, the system which is the object of the present invention comprises a light emitting and detecting device bearing the reference numeral 1 and which principally comprises a light emitter 2 principally of the light emitting diode (LED) type and a component 3 which detects light by means of a sensitive photodiode, such that the said system can emit light towards a laminar medium 5 bearing coded marks such as that which bears reference numeral 6, such that a light beam 4 falling on the graphic mark 6 is reflected in the form of radiation 7 to the sensor 3. The light emitting and detecting assembly is connected to the signal acquisition and conditioning device designated schematically by the number 8, which is in turn connected to the microprocessor 9 which can compare the light reflection data obtained from the acquisition system 8 with the parameter tables 10 and 11, emitting the appropriate setting instructions to the electromechanical system 12 of the machine or apparatus, which may consist of a peripheral such as a graph plotter.

In accordance with the present invention, it is essential to produce reference marks on the laminar medium 5, for example in accordance with a system of coordinates, which in the Figure is shown in the form of the axes X, Y of a Cartesian coordinate system such that, as will be appreciated, any other type of base reference marks can be established in order for the device 1 to obtain an initial reference for the said marks, in order that subsequent readings can be associated with the said marks and thus prevent any errors as a result of angular or linear displacement of the medium.

Instead of using X, Y coordinate systems or perpendicular axes, other systems, such as polar coordinates or the like, can also be used.

As shown schematically in FIG. 2, the laminar medium 5 can consist of a medium in the form of a sheet or card which comprises the reference signals for the coordinate axes, which have not been illustrated for the purposes of clarity, and different graph signalling areas by the user with the provision of enclosed zones which are shaded or similar. Thus, for example, various signalling zones such as 13, 14, 15, 16, 17, 18 and 19 are shown, each of which is intended for a different parameter and has pre-traced areas, such as the one bearing reference numeral 20 in zone 13, in order to standardise the dimensions of the graphic signal to be produced by the user. As will be comprised, the different pre-traced signals 20 will correspond to different values or ranges of values of the parameter corresponding to the reference area. Thus, for example, the area 1 could comprise a plurality of previously traced zones for indicating different languages, indication A corresponding to the literal "language" indication. In the case of the zone 14, the indication B may correspond to the "interface" indication and the indications B1 and B2 respectively to "baud rate" and "parity". The zone 15 may correspond to "graphics language" indicated by the letter C in this case. The area 16 may correspond to "page format", indicated by the letter D, whilst the letters D1 and D2 correspond to the possible indications "rotate" and "mirror". The area 17 may correspond to an indication "merge" with pre-traced zones for "on" and "off". The areas F1 and F2 can correspond to different parameters values for both width and density which can be observed in the indicating signals annexed with the pre-plotted signals of the zones 19 and 18 respectively. The letter F3 shows possible plotting pen numbers, indicated by the lines of pre-plotted signals.

In a first embodiment, the invention will be incorporated into a plotting apparatus, as with such an apparatus the laminar medium 5, typically a sheet of paper is printed by the apparatus itself.

In one embodiment of the invention there is firstly provided the laminar medium 5 which is printed by means of the printing devices of the machine or apparatus itself, by means of which the user can see rapidly and globally the operating state of the machine, upon assessing the print produced by the machine on the laminar medium. Subsequently the user proceeds to mark in the laminar medium itself, facilitated by the machine, the new values for the different parameters which are to be varied, for which purpose the pre-plotted zones relating to the different parameter values of the laminar medium are shaded, the said laminar medium is then fed into an input slot of the machine head, only one key on the control panel having to be pressed in order that the entire automatic recognition process can be initiated for the new marks made and in order that the process for correcting the parameters can be generated fully automatically without any intervention by the user being necessary.

There are printing-plotter apparatus having means for monitoring the printing plotting quality. Such an apparatus comprises an optical unit for optically monitoring the markings produced on a laminar medium. An example is disclosed in EP 393.291.

The present invention can advantageously be used in such an apparatus because the sheet carrying the information about the apparatus parameters can simply be printed out and a new sheet carrying information about altered operating parameters can simply be read by the integrated optical system, which is also used for monitoring print quality.

It is understood that the invention is not limited to printers or plotters, but that it can be used in a plurality of machines of different types when the operating parameters are adjustable as for example copying machines, telefacsimile apparatus and others.

We claim:

1. Method of altering the values of the setting parameters which determine the operating conditions of a printer/plotter machine or apparatus, characterised by:

a) the production on laminar medium of optically readable different marks which are respectively coded in accordance with different values of the setting or configuration parameters of the printer/plotter machine or apparatus;

b) supplying the laminar medium with the optically readable marks to an automatic optical reader head of the printer/plotter machine or apparatus;

c) automatic reading of graph signals produced on the laminar medium, by means of the optical reader head incorporated in the machine or apparatus control components;

d) transmitting the result of said automatic reading to a system microprocessor;

e) comparing the values read with fixed tables stored in a computer memory, containing the equivalents of the different parameter values;

f) emission of instructions by the microprocessor to the components of the machine or apparatus having operating conditions which depend on the precise values of the different parameters, and g) wherein the aforesaid production step includes allowing a printer/plotter user to apply optically readable graphic marks to the laminar medium prior to said supplying step.

2. Method of altering the values of the setting parameters of a machine or apparatus according to claim 1, characterised by previously making fixed reference marks in the laminar medium, the different setting parameter marks being referenced by association with the fixed reference marks.

3. Method of altering the values of the setting parameters of a machine or apparatus according to claim 1, characterised by the production of graphic marks on the laminar medium by shading of pre-plotted areas corresponding to coded values of certain parameters, disposed in the laminar medium in zones associated with those certain parameters.

4. Method of altering the values of the setting parameters of a machine or apparatus according to claim 1, characterised in that the values are coded by the arrangement of graphic marks in predetermined points of a coordinate system associated with fixed reference marks of the laminar medium.

5. Method of altering the values of the setting parameters of a machine or apparatus according to claim 2, characterised in that the optically readable marks on the laminar medium are read according to two successive phases, in the first of which the fixed reference marks of the laminar medium are read and in the second of which the different setting parameter marks associated with the fixed reference marks are read.

6. Method of altering the values of the setting parameters of a machine or apparatus according to claim 2, characterised in that the values are coded by the arrangement of graphic marks in predetermined points of a coordinate system associated with the reference marks of the laminar medium.

7. Method of altering the values of the setting parameters of a machine or apparatus according to claim 3, characterised in that the values are coded by the arrangement of graphic marks in predetermined points of a coordinate system associated with the reference marks of the laminar medium.

8. A method of altering the setting parameters which determine the operating conditions of a printer/plotter, comprising the steps of:

creating a laminar medium in the form of a graphical sheet having a plurality of zones, each zone being associated with at least one of the setting parameters and each zone having different reference areas respectively representing different values for the setting parameter of such zone;

supplying said graphical sheet which includes certain marked reference areas to an automatic reader head on the printer/plotter;

reading the marked reference areas with the reader head on the printer/plot;

changing the operating conditions of the printer/plotter based on the results obtained by said reading step, and including the step of allowing a printer/plotter user to apply graphic markings to the graphical sheet prior to said supplying step.

9. The method of claim 8 wherein said reading step includes reading the marked reference areas with an optical reader.

10. The method of claim 8 wherein said creating step is accomplished by the printer/plotter.

11. The method of claim 10 wherein said creating step includes creating a plurality of zones on a single sheet of laminar medium.

12. The method of claim 10 which includes creating a zone associated with different line width parameters.

13. The method of claim 12 wherein different exemplary line widths are displayed on the sheet of laminar medium.

14. The method of claim 10 which includes creating a zone associated with different area fill densities.

15. The method of claim 14 wherein different area fill densities are displayed on the sheet of laminar medium.

16. A method of altering the setting parameters which determine the operating conditions of a printer/plotter, comprising the steps of:

creating a laminar medium in the form of a graphical sheet having a plurality of zones, each zone being associated with at least one of the setting parameters and each zone having different reference areas respectively representing different values for the setting parameter of such zone;

supplying said graphical sheet which includes certain marked reference areas to an automatic reader head on the printer/plotter;

reading the marked reference areas with the reader head on the printer/plotter;

changing the operating conditions of the printer/plotter based on the results obtained by said reading step; and wherein said reading and changing steps occur automatically upon user-actuation of a single-step manual control.

* * * * *